United States Patent
Blumrich et al.

(10) Patent No.: US 7,149,920 B2
(45) Date of Patent: Dec. 12, 2006

(54) DETERMINISTIC ERROR RECOVERY PROTOCOL

(75) Inventors: Matthew A. Blumrich, Ridgefield, CT (US); Dong Chen, Croton On Hudson, NY (US); Alan G. Gara, Mount Kisco, NY (US); Philip Heidelberger, Cortlandt Manor, NY (US); Dirk I. Hoenicke, Ossining, NY (US); Burkhard D. Steinmacher-Burow, Mount Kisco, NY (US); Pavlos M. Vranas, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 10/674,952

(22) Filed: Sep. 30, 2003

(65) Prior Publication Data

US 2005/0081078 A1    Apr. 14, 2005

(51) Int. Cl.
    *G06F 11/00*      (2006.01)
    *G06F 11/07*      (2006.01)

(52) U.S. Cl. .............................. 714/4; 714/23; 714/24
(58) Field of Classification Search ................ 714/717
See application file for complete search history.

(56) References Cited

U.S. PATENT DOCUMENTS

| 6,101,166 A * | 8/2000 | Baldwin et al. ............. 370/222 |
| 6,442,694 B1 * | 8/2002 | Bergman et al. .............. 726/22 |
| 6,480,473 B1 * | 11/2002 | Chambers et al. .......... 370/253 |
| 6,591,374 B1 * | 7/2003 | Christensen et al. .......... 714/14 |
| 2003/0101367 A1 * | 5/2003 | Bartfai et al. .................. 714/4 |

* cited by examiner

*Primary Examiner*—Scott Baderman
*Assistant Examiner*—Joseph Schell
(74) *Attorney, Agent, or Firm*—Scully, Scott, Murphy & Presser, P.C.; Daniel P. Morris, Esq.

(57) ABSTRACT

Disclosed are an error recovery method and system for use with a communication system having first and second nodes, each of said nodes having a receiver and a sender, the sender of the first node being connected to the receiver of the second node by a first cable, and the sender of the second node being connected to the receiver of the first node by a second cable. The method comprising the step of after one of the nodes detects an error, both of the nodes entering the same defined state. In particular, the receiver of the first node enters an error state, stays in the error state for a defined period of time T, and, after said defined period of time T, enters a wait state. Also, the sender of the first node sends to the receiver of the second node an error message for a defined period of time Te, and after the defined period of time Te, the sender of the first node enters an idle state.

18 Claims, 3 Drawing Sheets

DETERMINISTIC ERROR RECOVERY PROTOCOL

BACKGROUND OF THE INVENTION

1. Field of the Invention

This invention generally relates to the field of error recovery, and more particularly, the invention relates to a procedure that is very well suited for error recovery across long communication lines. Even more specifically, the invention relates to an error recovery protocol that is particularly well adapted for use with massively parallel computers used for various applications such as, for example, applications in the field of life sciences.

2. Background Art

FIG. 1 illustrates a pair of communication nodes A and B, each of which has a sender and a receiver. These two such nodes are connected with two cables. Each wire connects a sender/receiver pair. The cables may be long in the sense that a bit of data takes many clock cycles to traverse the cable. This type of hardware is encountered in many applications and most notably in massively parallel supercomputers.

Obviously, as with any communication channel, errors can occur during communication. Assuming that the receivers have the capability of detecting such errors, a protocol is needed in order to ensure that both nodes recover from the error correctly and resume communication without any data loss. If there are no extra sideband cables to communicate recovery signals, this is a difficult task since the original cables must be used. In doing so, one is exposed to errors in the recovery signals themselves. Although error recovery methods that solve this problem exist, they have the disadvantage that they do not put the system of two nodes into a known state and that they depend on time-out and specific data sequence methods.

SUMMARY OF THE INVENTION

An object of this invention is to provide a procedure for recovering when one or both of a pair of connected communication nodes encounters an error.

Another object of the present invention is to provide an error recovery procedure that is effective across long communication lines.

A further object of the invention is to put both of a pair of nodes that communicate with each other into a known state after one or both nodes encounter an error.

Another object of this invention is to put both of a pair of nodes into a known state after one or both of the nodes encounter an error, and to do this independently of how many further errors are encountered during recovery (provided the number of errors is not infinite) and without requiring any special data sequences or time outs.

These and other objectives are obtained with an error recovery method and system for use with a communication system having first and second nodes, each of said nodes having a receiver and a sender, the sender of the first node being connected to the receiver of the second node by a first cable, and the sender of the second node being connected to the receiver of the first node by a second cable. The method comprises the step of, after one of the nodes detects an error, both of the nodes entering the same defined state. In particular, the receiver of the first node enters an error state, stays in the error state for a defined period of time T, and, after said defined period of time T, enters a wait state. Also, the sender of the first node sends to the receiver of the second node an error message for a defined period of time Te, and after the defined period of time Te, the sender of the first node enters an idle state.

The preferred embodiment of this invention, described in detail below, provides a protocol that is guaranteed to put both nodes into a known state after one or both nodes encounter an error. This is achieved independently of how many further errors are encountered during recovery (provided they are not infinite). Also, no special data sequences or time outs are used. These properties make this method robust.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
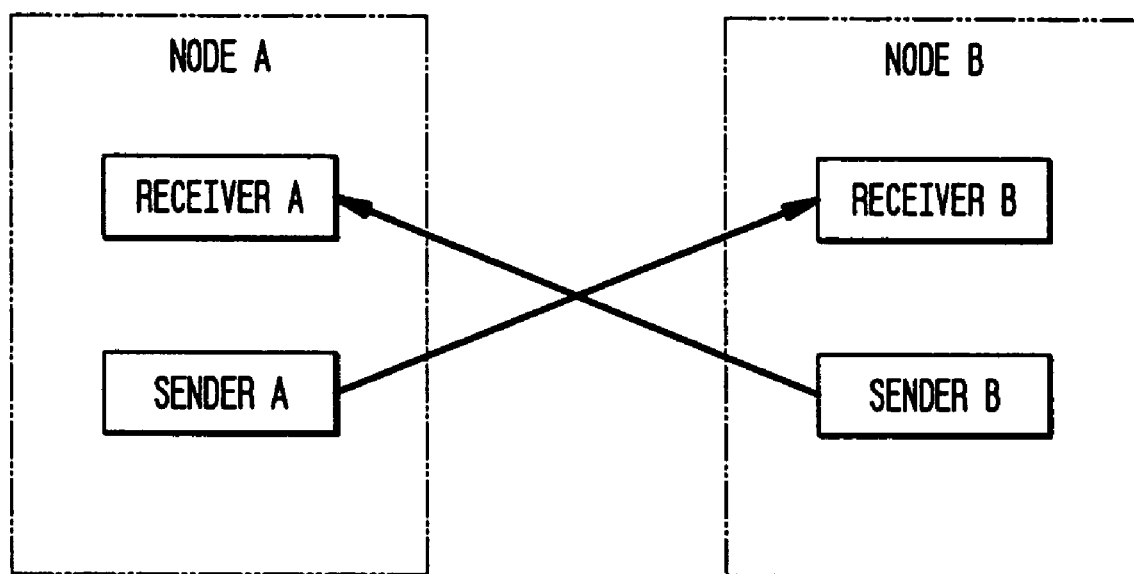
FIG. 1 illustrates a pair of connected communication nodes.

FIG. 1 shows two nodes A, B connected with a pair of cables. Receiver A and B are identical. Also sender A and B are identical. For simplicity, assume that the cables transfer one byte of data at each clock cycle. The communication protocol is packet based with byte-long packet headers that must be recognized by the receivers and trailers that contain some type of packet integrity check (such as checksum or CRC). When the receivers receive a special type of byte, called IDLE, they recognize it and do nothing further. If a header byte is not of known type, or if the packet integrity check fails, the receiver goes into an ERROR state. During normal operation, if there are no packets to be sent, the senders transmit IDLE and the receivers are in their normal WAIT state where they listen to incoming traffic.

If either node gets an error (unknown header type or bad packet integrity check), the protocol of this invention ensures that at some later time both nodes will have their receivers in normal WAIT state and their senders sending IDLE. This will happen independently of how many errors are encountered until that state is reached (for as long as the number of errors is finite). After this, sender A and sender B enter their standard resend mode (not necessarily at the same time). In this protocol there is no timer in the sender that times out if a packet is not acknowledged within a certain time. A special byte is used, called ERROR_BYTE. This byte can be anything for as long as it is not a recognizable header type by the receiver.

Figure 2:
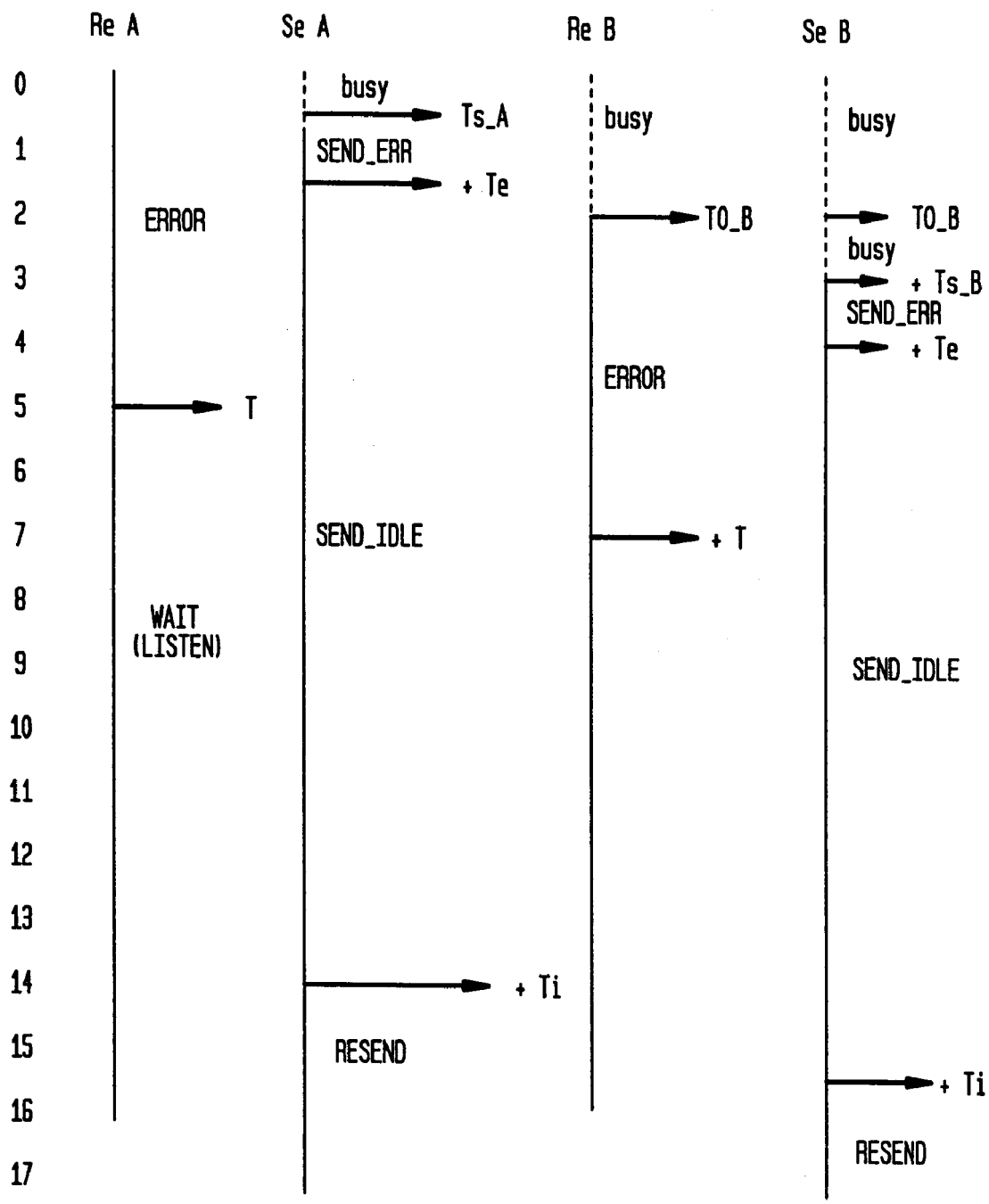
FIG. 2 is a flow chart showing a preferred error recovery procedure of this invention.

The protocol implementation, with reference to FIG. 2, is as follows:

Receiver:

1) Wait for known header type. If the receiver gets anything else, it goes to ERROR_STATE.

2) Normal state machine processing:

If the receiver gets any bad packet integrity check, it goes to ERROR_STATE.

3) ERROR_STATE:

Do not listen to ANY incoming data.

Set errror_flag bit to 1.

Stay in error for T cycles and then go back to WAIT_STATE.

Sender:
1) INITIAL_STATE:
If (error_flag=1), then
　　reset it to 0 and go to SEND_ERROR state
else
　　operate normally.
2) SEND_ERROR state:
Send the ERROR_BYTE for Te cycles (this will put the neighbor's receiver to ERROR_STATE)
If (error_flag=1), then
　　go to INITIAL_STATE state
else
　　go to SEND_IDLE state.
3) SEND_IDLE state:
Send IDLE for Ti cycles
If (error_flag=1), then
　　go to INITIAL_STATE state
else
　　go to RESEND_STATE.
4) RESEND_STATE:
Resend any data (including acknowledgements etc . . . ) that may have been lost during recovery. Any suitable mechanism that keeps track of what has been successfully received by the corresponding receiver may be used. Such mechanisms are known in the art.
Go back to INITIAL_STATE.

In the above discussed scheme, there are 3 parameters:
T—the number of cycles the receiver must stay in ERROR_STATE,
Te—the number of cycles the sender sends ERROR_BYTEs, and
Ti—the number of cycles the sender sends IDLE_BYTEs.

These parameters do not need to be hard-wired but they can be set in registers by the software. This will give additional flexibility.

The Te can be small. The purpose of the ERROR_BYTE is to put the neighbor's receiver into ERROR_STATE. Even if an ERROR_BYTE is corrupted, the neighbor's receiver will still go to ERROR_STATE. It may be noted that counting is not required here. A single ERROR_BYTE will put the receiver into ERROR_STATE. If the first byte is mistaken for an IDLE, then the second ERROR_BYTE will accomplish the desired result and so on. Even if it is mistaken for a DATA_TYPE, the packet integrity will be wrong and will put the receiver into ERROR_STATE. The only fail mode of this protocol is a conspiracy that turns the Te ERROR_BYTEs into a non-error pattern. However, the choice of bits in the ERROR_BYTE is arbitrary for as long as the byte is not recognizable by the receiver. Therefore, one can choose these bits to minimize the chance that a malfunction in the signaling technique transforms them to a known type. Furthermore, one can pick several error bytes, i.e. ERROR_BYTE_0, ERROR_BYTE_1, etc., and send them repeatedly. Also, since there is no restriction on Te, one can make this sequence as long as desirable. The important consideration is that any sequence of Te bytes that are not of known type can put the receiver into ERROR_STATE and this is all that is needed.

The Ti must be set at some large value. Specifically, this value needs to large enough to allow all previous packets and ERROR_BYTEs to get out of the cables and then some more (see calculation below).

When the receiver is in ERROR_STATE, it does not listen to anything. Therefore even if there are errors, they are fully ignored. When the receiver comes out after T cycles, it only gets IDLEs for a while and then the resend data. If, after it comes out, the receiver gets a bad IDLE or an error during resend, then the sequence is repeated (discussed further below).

An important feature is that there is a period during which both receivers are in WAIT state receiving IDLES and both senders are in IDLE_SEND state. This is a known state and it occurs before resend.

Detailed Calculation of the Three Parameters:

T and Ti are calculated below. These calculations show that one can pick values for which the receiver goes back to WAIT_STATE after the stream of idles has started and before it ends (resend starts after the stream of IDLEs ends). The calculations also show that this is true independently of the state of the receiver/sender in either node. Also, Te can be set to any non-zero positive value.

Assume that node A goes into the error state before or at the same time as B. As will be apparent to those of ordinary skill in the art, the case with B going into error before A is the same but with A and B interchanged.

The times below are absolute and time zero is when A goes into ERROR_STATE. All counters increment once each cycle.

For node A:

$T\_A=0$

Receiver A goes to ERROR_STATE and sets eflag=1. The receiver A counter starts counting from 0 up to T.

$T\_A=Ts\_A$

Sender finishes current task. This can happen immediately, in which case Ts_A=0, or after a maximum time that depends on the hardware design. In any case, this max value is deterministic and it does not change. That time interval is denoted by Tr.

Therefore $0<Ts\_A<Tr$.

Sender A sees eflag=1 and goes to SEND_ERROR state. It resets eflag=0. Starts sending ERROR_BYTE bytes for Te cycles.

$T\_A=Ts\_A+Te$

Sender A goes to SEND_IDLE state and starts sending IDLE for Ti cycles.

$T\_A=Ts\_A+Te+Ti$

Sender A stops sending IDLE and goes to the resend state and starts the resend sequence.

For node B:

$T\_B=T0\_B$

Receiver B goes to ERROR_STATE and sets eflag=1. The receiver B counter starts counting from 0 up to T. T0_B can be as small as zero if node B got an error at exactly the same time as node A. T0_B can be as large as the time since the last ERROR_BYTE was received by node B.

$0<T0\_B<Ts\_A+Te+Tc$ where Tc is a time larger than the time it takes one byte to traverse the longest cable in the network.

$T\_B=T0\_B+Ts\_B$

Sender finishes current task. As described above, $0<Ts\_B<Tr$.

Sender B sees eflag=1 and goes to SEND_ERROR state. Sender B resets eflag=0. Starts sending ERROR_BYTE bytes for Te cycles.

$T\_B=T0\_B+Ts\_B+Te$

Sender B goes to SEND_IDLE state and starts sending IDLE for Ti cycles.

$$T\_B = T0\_B + Ts\_B + Te + Ti$$

Sender A stops sending IDLE and goes to the resend state and starts the resend sequence.

To summarize:

$$0 < Ts\_A < Tr$$

$$0 < Ts\_B < Tr$$

Tr=max time for sender to come back to its initial state.
Tc=is a time larger than the time it takes one byte to traverse the longest cable in the network.

$$0 < T0\_B < Ts\_A + Te + Tc$$

T0_B is the time the counter of receiver B starts.
From the above, one has that for receiver A:
First IDLE arrives at:

$$T\_A = T0\_B + Ts\_B + Te + Tc$$

And last IDLE arrives at:

$$T\_A = T0\_B + Ts\_B + Te + Tc + Ti$$

Also from the above, one has that for receiver B:
First IDLE arrives at:

$$T\_B = Ts\_A + Te + Tc$$

And last IDLE arrives at:

$$T\_B = Ts\_A + Te + Tc + Ti$$

Therefore the constraint for the parameter T for node A is:

$$T0\_B + Ts\_B + Te + Tc < T < T0\_B + Ts\_B + Te + Tc + Ti$$

And the constraint for node B is:

$$Ts\_A + Te + Tc < T + T0\_B < Ts\_A + Te + Tc + Ti \geqq$$

$$Ts\_A + Te + Tc - T0\_B < T < Ts\_A + Te + Tc + Ti - T0\_B$$

These constraints must be satisfied at the same time. Also, they must be satisfied for any value of Ts_A, Ts_B in the ranges given above. Therefore one must replace the left hand sides with the max value they can have and the right hand sides with the min value they can have. Then from the two inequalities, one must pick the max left hand side and the min right hand side. One gets:

$$2(Te + Tc + Tr) < T < Ti - Tr \quad \text{(Equation 1)}.$$

Therefore one should pick T as in equation (1) above and Ti must satisfy:

$$2Te + 2Tc + 3Tr < Ti \quad \text{(Equation 2)}.$$

Obviously equation 1 has a solution for T.

Now, there is a further constraint in Ti. Since receiver A will start listening at time T_A=T but receiver B will not start listening until time T_B=T0_B+T, there is an interval T0_B that A can receive a "bad" IDLE and go back into ERROR state before the "known state" described above is entered (both receivers in normal wait and both senders in normal send). Then the sender A may resend the ERROR_BYTEs during a time that B is not listening. If this happens, B will continue and receiver B will come out of ERROR_STATE. Also, sender B will continue and will start the resend sequence at time T_B=T0_B+Ts_B+Te+Ti. This will arrive at A a little later, but consider the worst case of zero length wire. So, this will arrive at A at time T0_B+Ts_B+Te+Ti. Receiver A needs to be back at listening at this time.

Receiver A will be back at listening at time 2T<T_A<2T+T0_B. Therefore we need:

$$2T + T0_B < T0\_B + Ts\_B + Te + Ti \geqq$$

$$2T - Ts\_B - Te < Ti \quad \text{For example, this is satisfied if:}$$

$$2T < Ti \quad \text{(Equation 3)}.$$

Equation 3 is consistent with equation 1 and therefore there are settings for which the known state (both receivers in normal wait and both senders sending IDLEs) is reached.

Parameter values:
An example of settings is given below:
Assume that $$2Tc = Tr$$

Also, pick Te to be any number reasonably large. For simplicity let also $$2Te = Tr$$

Of course this is unnecessarily large since Te needs only be more than enough to put the receiver into error state.

If one picks:

$$T = 5Tr$$

$$Ti = 12Tr$$

then equations 1 and 3 are satisfied.

In terms of Tc:

$$Te = Tc$$

$$T = 10\ Tc$$

$$Ti = 24\ Tc$$

Figure 3:
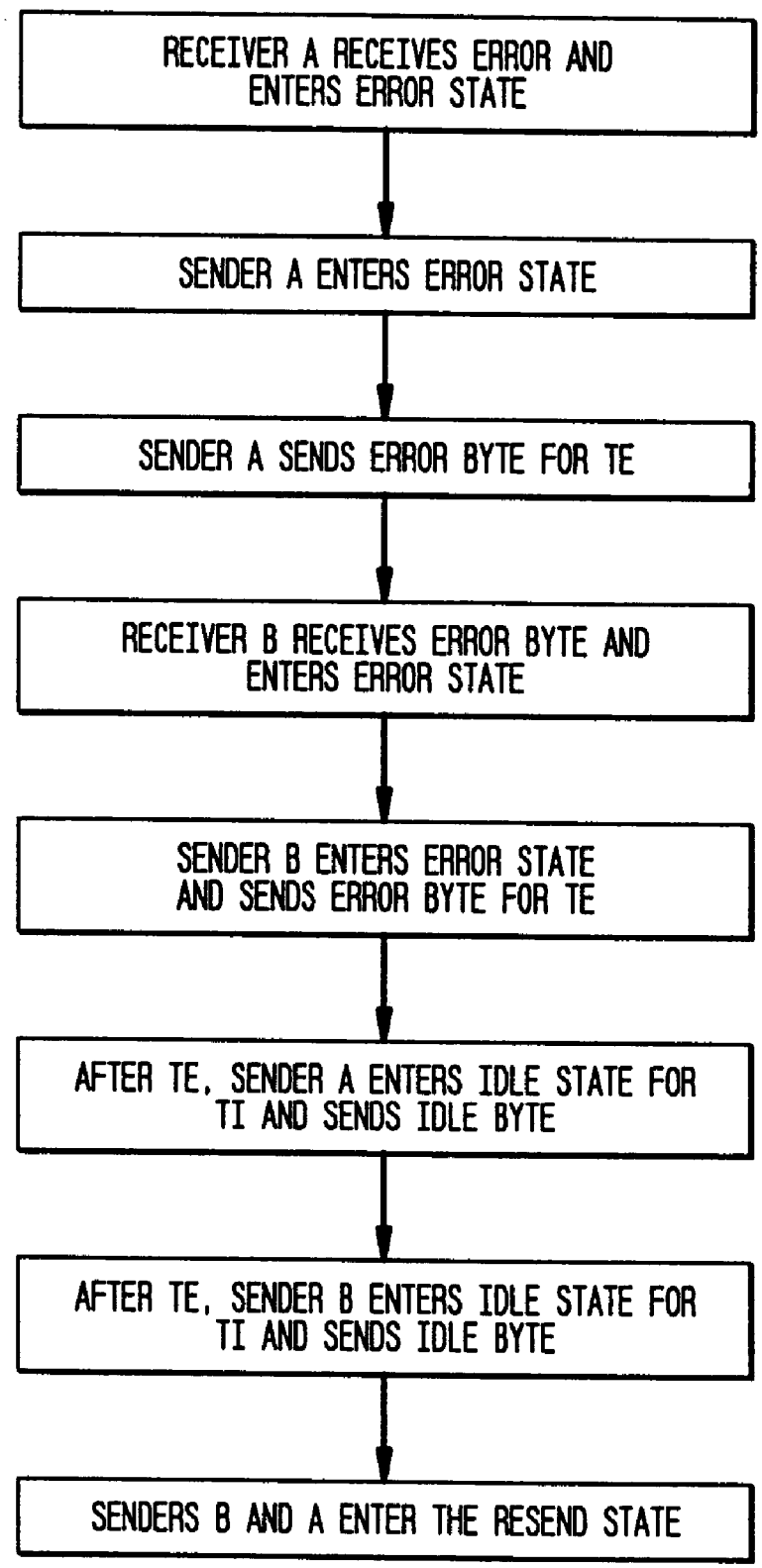
FIG. 3 is a time diagram showing various time periods used in the preferred embodiment of the invention.

Time diagram:
The time diagram for the above example is given in FIG. 3.

Time is from top to bottom. The * indicate time lines that can be shrunk to 0 but cannot be larger than the *** indicate. The | indicate time lines that are fixed. The numbers on the left indicate units of Tr.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An error recovery method for use with a communication system having first and second nodes, each of said nodes having a receiver and a sender, the sender of the first node being connected to the receiver of the second node by a first cable, and the sender of the second node being connected to the receiver of the first node by a second cable, the method comprising the steps:

after one of the nodes detects an error, both of the nodes entering the same defined state, including the steps of:

the receiver of the first node entering an error state, staying in the error state for a defined period of time T, and, after said defined period of time T, entering a wait state, and the sender of the first node sending to the receiver of the second node an error message for a defined period of time Te, and after the defined period of time Te, entering an idle state.

2. A method according to claim 1, wherein the step of the sender of the first node entering the idle state includes the step of:
the sender of the first node sending an idle signal to the receiver of the second node for a period of time Ti.

3. A method according to claim 2, wherein Ti is greater than Te.

4. A method according to claim 1, wherein said error includes said one of the nodes receiving the error message from the other of the nodes.

5. A method according to claim 1, wherein in said same defined state, the receivers of both nodes are in the wait state, and the senders of both nodes are in the idle state.

6. A method according to claim 5, further comprising the step of, after both nodes are in said same defined state, the senders of both nodes entering a resend state.

7. An error recovery system for use with a communication system having first and second nodes, each of said nodes having a receiver and a sender, the sender of the first node being connected to the receiver of the second node by a first cable, and the sender of the second node being connected to the receiver of the first node by a second cable, the error recovery system comprising:
means for putting both nodes, after one of the nodes detects an error, into the same defined state, including
means for putting the receiver of the first node into an error state, keeping the receiver of the first node in the error state for a defined period of time T, and, after said defined period of time T, putting the receiver of the first node into a wait state, and
means for sending from the sender of the first node to the receiver of the second node an error message for a defined period of time Te, and for putting the sender of the first node into an idle state after the defined period of time Te.

8. A system according to claim 7, wherein when the sender of the first node is in the idle state, the sender of the first node sends an idle signal to the receiver of the second node for a period of time Ti.

9. A system according to claim 8, wherein Ti is greater than Te.

10. A system according to claim 7, wherein said error is detected when one of the nodes receives the error message from the other of the nodes.

11. A system according to claim 7, wherein in said same defined state, the receivers of both nodes are in the wait state, and the senders of both nodes are in the idle state.

12. A system according to claim 11, further comprising means for putting the senders of both nodes into a resend state after both nodes are in said same defined state.

13. A program storage device readable by machine, tangibly embodying a program of instructions executable by the machine to perform an error recovery method, and for use with a communication system having first and second nodes, each of said nodes having a receiver and a sender, the sender of the first node being connected to the receiver of the second node by a first cable, and the sender of the second node being connected to the receiver of the first node by a second cable, said error recovery method comprising the steps:
after one of the nodes detects an error, both of the nodes entering the same defined state, including the steps of
the receiver of the first node entering an error state, staying in the error state for a defined period of time T, and, after said defined period of time T, entering a wait state, and
the sender of the first node sending to the receiver of the second node an error message for a defined period of time Te, and after the defined period of time Te, entering an idle state.

14. A program storage device according to claim 13, wherein the step of the sender of the first node entering the idle state includes the step of
the sender of the first node sending an idle signal to the receiver of the second node for a period of time Ti.

15. A program storage device according to claim 14, wherein Ti is greater than Te.

16. A program storage device according to claim 13, wherein said error includes said one of the nodes receiving the error message from the other of the nodes.

17. A program storage device according to claim 13, wherein in said same defined state, the receivers of both nodes are in the wait state, and the senders of both nodes are in the idle state.

18. A program storage device according to claim 17, wherein said method further comprises the step of, after both nodes are in said same defined state, the senders of both nodes entering a resend state.

* * * * *